Dec. 15, 1925.
J. C. MORRELL
MOTOR VEHICLE BRAKE
Filed May 3, 1924
1,565,489
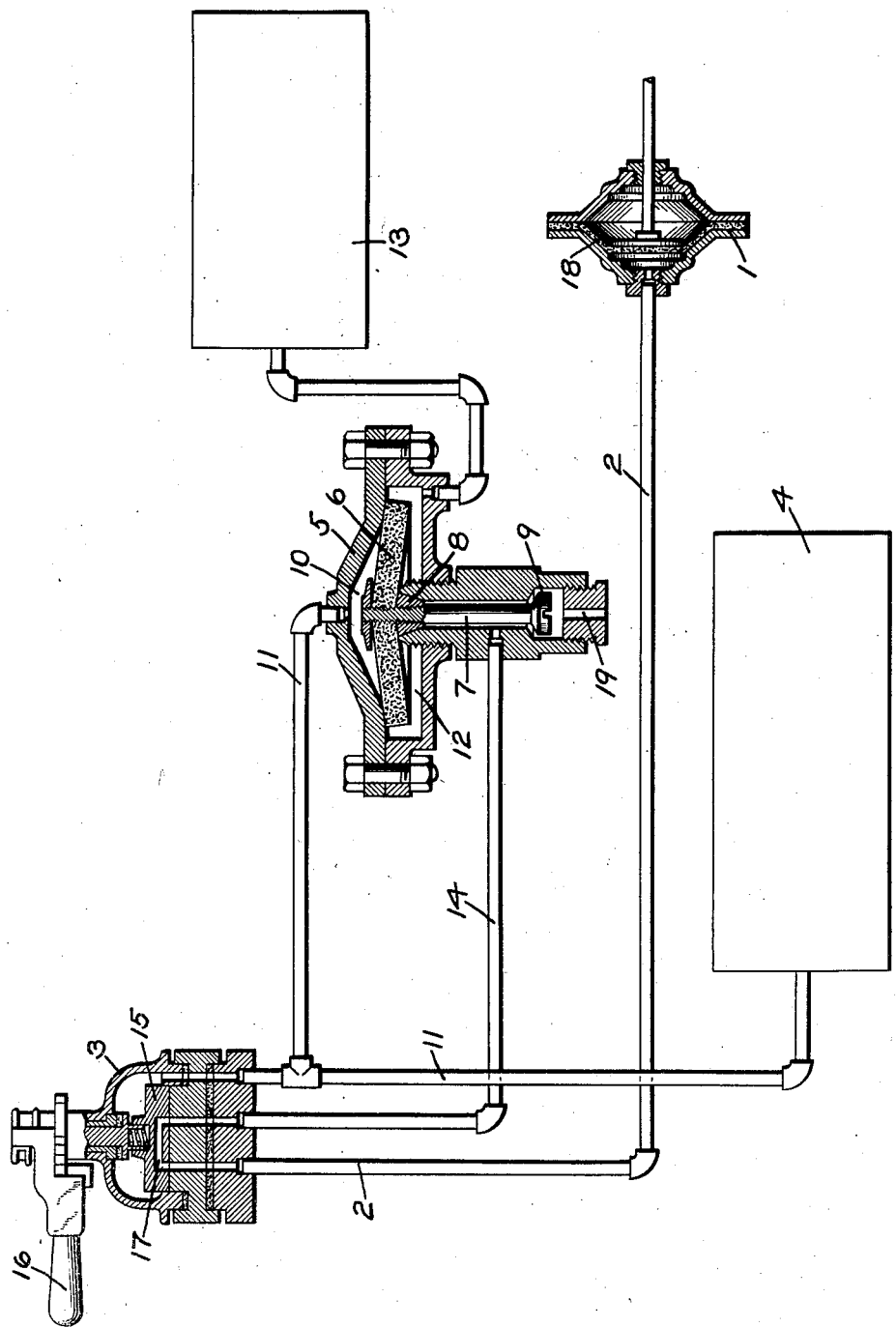
INVENTOR
JOSEPH C. MORRELL
BY Wm. M. Cady
ATTORNEY Patented Dec. 15, 1925.

1,565,489

UNITED STATES PATENT OFFICE.

JOSEPH C. MORRELL, OF WHITE PLAINS, NEW YORK, ASSIGNOR TO THE WESTINGHOUSE AIR BRAKE COMPANY, OF WILMERDING, PENNSYLVANIA, A CORPORATION OF PENNSYLVANIA.

MOTOR-VEHICLE BRAKE.

Application filed May 3, 1924. Serial No. 710,783.

*To all whom it may concern:*

Be it known that I, JOSEPH C. MORRELL, a citizen of the United States, residing at White Plains, in the county of Westchester and State of New York, have invented new and useful Improvements in Motor-Vehicle Brakes, of which the following is a specification.

This invention relates to fluid pressure brakes, and more particularly to a fluid pressure brake for a motor vehicle.

The principal object of my invention is to provide improved means for automatically causing an application of the brakes in case the main reservoir pipe to the brake valve should become broken.

In the accompanying drawing, the single figure is a diagrammatic view of a fluid pressure brake equipment embodying my improvement.

As shown in the drawing, the equipment may comprise a brake chamber 1, connected by pipe 2 to a brake valve device 3, a main reservoir or source of fluid under pressure 4, and an emergency valve device 5.

The emergency valve device 5 may comprise a casing having a chamber containing a flexible diaphragm 6. Secured to said diaphragm is a valve stem 7, carrying a supply valve 8 and a release valve 9. The chamber 10 at one side of the diaphragm 6 is connected to pipe 11 which communicates with the main reservoir 4. Chamber 12 at the other side of the diaphragm is connected to an emergency reservoir 13.

The space surrounding the valve stem 7 is connected to a pipe 14 which leads to the seat of the rotary valve 15 of the brake valve device 3. The brake valve device 3 is shown in the drawing as of the rotary slide valve type, although any other brake valve device, such as the type employed in connection with automatic fluid pressure brakes may be employed.

In operation, with the brake valve handle 16 in release position, as shown in the drawing, the rotary valve 15 connects pipe 14 through a cavity 17 with pipe 2. Fluid under pressure is supplied from the main reservoir 4, through pipe 11 to diaphragm chamber 10 of the emergency valve device 5 and operates to press the free periphery of the diaphragm outwardly, so as to permit flow of fluid from chamber 10 to chamber 12 and thence to the emergency reservoir 13. Said reservoir is thus normally charged with fluid under pressure.

If the pipe 11 should break, the pressure in chamber 10 of the emergency valve device will be reduced and the emergency reservoir pressure in chamber 12 will act on the diaphragm 6 to flex same, so as to lift the valve stem 7 and cause the valve 9 to seat while valve 8 is unseated. Fluid under pressure will then be supplied from the reservoir 13, past the valve 8 to pipe 14 and thence through cavity 17 of the rotary valve 15 to pipe 2 and the brake chamber 1.

The flexible diaphragm 18 in the brake chamber is then moved outwardly to effect an application of the brakes.

In the normal operation of the brakes, when the brake valve handle 16 is in release position, fluid is released from the brake chamber 1 through pipe 2, cavity 17 in the rotary valve 15, pipe 14 and past the normally open release valve 9 of the emergency valve device 5 to an atmospheric exhaust port 19.

It will thus be seen that since the exhaust from the brake chamber 1 through the brake valve device is controlled by the emergency valve device 5, the exhaust will be closed by operation of the emergency valve device even though the brake valve device is in release position.

Having now described my invention, what I claim as new and desire to secure by Letters Patent, is:—

1. In a fluid pressure brake, the combination with a brake valve device for controlling the application and release of the brakes, of a source of fluid under pressure from which fluid is supplied by operation of said brake valve device to apply the brakes, and an emergency valve device provided with an exhaust port through which fluid is released by operation of said brake valve device in releasing the brakes and operating upon loss of pressure from said source for closing said exhaust port and for effecting an application of the brakes.

2. In a fluid pressure brake, the combination with a brake chamber and a brake valve device for supplying and releasing fluid to and from said brake chamber, of a source of fluid under pressure from which fluid under pressure is supplied to the brake chamber by operation of the brake valve device and an emergency valve device provided with an exhaust port through which fluid is released from the brake chamber by operation of the brake valve device and operating upon failure of pressure in said source for closing said exhaust port and for supplying fluid under pressure to said brake chamber.

3. In a fluid pressure brake, the combination with a brake application and release pipe, a main reservoir, and a brake valve device connected by a pipe to said reservoir and adapted to control the supply and release of fluid to and from said brake application and release pipe, of a valve device normally connecting said brake application and release pipe, through said brake valve device, with an exhaust port and operating upon breakage of said main reservoir pipe for closing said exhaust port and for supplying fluid under pressure through said brake valve device to the brake application and release pipe.

In testimony whereof I have hereunto set my hand.

JOSEPH C. MORRELL.